(12) United States Patent
Fascenda et al.

(10) Patent No.: US 10,108,810 B2
(45) Date of Patent: Oct. 23, 2018

(54) SYSTEM AND METHOD FOR SECURE DOCUMENT EMBEDDING

(71) Applicant: Protected Mobility, LLC, Rockville, MD (US)

(72) Inventors: Anthony C. Fascenda, Leland, NC (US); Emil Sturniolo, Medina, OH (US)

(73) Assignee: Global Integrity, Inc., McLean, VA (US)

( * ) Notice: Subject to any disclaimer, the term of this patent is extended or adjusted under 35 U.S.C. 154(b) by 23 days.

(21) Appl. No.: 15/044,908

(22) Filed: Feb. 16, 2016

(65) Prior Publication Data

US 2016/0239673 A1 Aug. 18, 2016

Related U.S. Application Data

(60) Provisional application No. 62/116,190, filed on Feb. 13, 2015.

(51) Int. Cl.
*G06F 21/62* (2013.01)
*G06F 21/10* (2013.01)

(52) U.S. Cl.
CPC .................... *G06F 21/6209* (2013.01)

(58) Field of Classification Search
CPC .. G06F 21/6209; G06F 21/6245; G06F 21/10; G06F 2221/0748
See application file for complete search history.

(56) References Cited

U.S. PATENT DOCUMENTS

| 5,696,685 | A  | * | 12/1997 | Lee ........................ G06K 15/02 101/71 |
| 6,880,091 | B1 | * | 4/2005  | Mattis ..................... G06F 21/31 713/194 |
| 7,120,802 | B2 |   | 10/2006 | Shear et al. |
| 7,865,640 | B1 | * | 1/2011  | Lewis ................. G06F 13/4068 710/305 |
| 8,438,644 | B2 | * | 5/2013  | Watters ................ G06F 21/577 705/51 |
| 8,593,678 | B2 | * | 11/2013 | Ohishi ............... H04N 1/00204 358/1.13 |
| 8,700,891 | B2 | * | 4/2014  | Qi ........................ H04L 63/162 709/230 |
| 9,160,719 | B2 |   | 10/2015 | Marlow et al. |

(Continued)

OTHER PUBLICATIONS

Castiglione, Aniello, et al., "New Steganographic Techniques for the OOXML File Format," ARES 2011, LNCS 6908, 2011, pp. 344-358.

(Continued)

*Primary Examiner* — Yonas A Bayou
(74) *Attorney, Agent, or Firm* — Nixon & Vanderhye P.C.

(57) ABSTRACT

The example non-limiting technology herein uses a Microsoft Office module or other application that automatically encrypts an Office document (Excel, PowerPoint, Word) or other software object and embeds the encrypted data within a "mule" or carrier file of the same type. On user's systems without the module installed, the "mule" file will open normally without exposing the embedded secret file. On systems with the module installed and properly authorized, the user will see the encrypted file open without seeing the "mule" file. This allows the secure transport of a file within a plaintext "mule" file.

25 Claims, 6 Drawing Sheets

Inserting ciphertext into the [Content_Types].xml file (56) References Cited

U.S. PATENT DOCUMENTS

| | | | | |
|---|---|---|---|---|
| 2004/0223608 A1* | 11/2004 | Oommen | ............. | H04L 9/0656 |
| | | | | 380/28 |
| 2007/0255965 A1* | 11/2007 | McGucken | ............. | G06F 21/10 |
| | | | | 713/193 |
| 2009/0217051 A1* | 8/2009 | Bacci | ..................... | H04H 20/38 |
| | | | | 713/176 |
| 2011/0016311 A1* | 1/2011 | Durand | ................. | H04L 9/0836 |
| | | | | 713/155 |
| 2011/0185169 A1* | 7/2011 | Munger | ................. | H04L 45/00 |
| | | | | 713/153 |
| 2012/0296916 A1* | 11/2012 | Bittles | ............... | G06F 17/30911 |
| | | | | 707/741 |

OTHER PUBLICATIONS

Schneier, Bruce, "Secrets & Lies: Digital Security in a Networked World," John Wiley & Sons, 2000, p. 244 et seq (no copy attached;.

* cited by examiner

FIG. 1
Basic Schema of an Office module

FIG. 2
Structure of an Office XML file

FIG. 3
Inserting ciphertext into the [Content_Types].xml file

FIG. 4
Hidden Directories & Files

[Content_Types].xml file

```
16  <Override PartName="/xl/tables/table4.xml" ContentType="application/vnd.openxmlformats-officedocument.
17  <Override PartName="/xl/charts/chart1.xml" ContentType="application/vnd.openxmlformats-officedocument.
18  <Override PartName="/xl/charts/chart2.xml" ContentType="application/vnd.openxmlformats-officedocument.
19  <Override PartName="/xl/calcChain.xml" ContentType="application/vnd.openxmlformats-officedocument.spre
20  <Override PartName="/xl/customXml/itemProps1.xml" ContentType="application/vnd.openxmlformats-officedocume
21  <Override PartName="/docProps/core.xml" ContentType="application/vnd.openxmlformats-package.core-prope
22  <Override PartName="/docProps/app.xml" ContentType="application/vnd.openxmlformats-officedocument.exte
23  <Override PartName="/docProps/custom.xml" ContentType="application/vnd.openxmlformats-officedocument.cu
24  <Override PartName="/xl/charts/colors1.xml" ContentType="application/vnd.openxmlformats-office.chartcolorstyle+xml"/>
25  <Override PartName="/xl/charts/style1.xml" ContentType="application/vnd.openxmlformats-office.chartstyle+xml"/>
26  <Override PartName="/xl/charts/colors2.xml" ContentType="application/vnd.openxmlformats-office.chartcolorstyle+xml"/>
27  <Override PartName="/xl/charts/style2.xml" ContentType="application/vnd.openxmlformats-office.chartstyle+xml"/>
28  </Types>
29  <!--TMX248:KWVLRPJYWQP?TNOAXWKCJXKAIJPNWZPM1BpeXRzWNpIbXp1dU0yK1JIYnHRFYvYUdqUDVQejJrS0xvYVhQN0paVFJU
30  KzA3NmlCMG9nQnlZ^?eZNFWKBGGaf1nwmXvXWGc1AeSAtvoR0Q6eKIUwSnrFrEsCU6jxUHLb8lYrNX2Mb2P
31  N38rvL7ehieEZMFW3qyllGPFdcltamhwen3ydHLIpuMoCCpuchowr3rVmeOsepUVY2MNzJuk4l3d0v
32  OS1dC9dtZWy7w3qyl1GPFdcltamhwen3ydHLIpuMoCCpuchowr3rVmeOsepUVY2MNzJuk4l3d0v
33  C91ESv0Q9LHhhA9mbEHEitt6hIx34180B2cF2ZWiVElBFRitWOZyWPMTOShJ9WXIL3fqi4v8ritd
```

15

<!--TMX248:KWVLR
KzA3NmlCMG9nQnlZ
N38rvL7ehieEZMFW

16

FIG. 5
Secure Text Insertion

FIG. 6
Extracting Plaintext

FIG. 7
Communications Environment Schematic

SYSTEM AND METHOD FOR SECURE DOCUMENT EMBEDDING

CROSS-REFERENCE TO RELATED APPLICATIONS

This application claims the benefit of U.S. Provisional Patent Application No. 62/116,190 filed Feb. 13, 2015, incorporated herein by reference.

STATEMENT REGARDING FEDERALLY SPONSORED RESEARCH OR DEVELOPMENT

None.

FIELD

The example non-limiting technology herein relates to steganography and cryptography, and more particularly to securing information including but not limited to intellectual property by embedding it with other information. In more detail, the example non-limiting technology herein relates to securing proprietary drawings, documents, presentations etc. within existing innocuous documents such that they can only be opened on properly authorized devices and accounts.

BACKGROUND

Typical methods for securing intellectual property involve using password-protected files. Such methods require the distribution and retention of a password to open the file. Passwords can be freely forwarded with the document to non-authorized users resulting in loss of intellectual property.

Steganography or "hidden writing" has been known for centuries. In ancient Greece, secret messages were tattooed onto the bald head of a courier who then grew out his hair to hide the message. When the courier reached his destination, he shaved his head to reveal the message on his bare scalp. In the middle ages, secret messages were encoded by objects in plain view such as flower arrangements, notes on a page of music, stars drawn onto a map, or the directions heads faced in a group portrait. In more recent times, microdots pasted as a "period" on a page of newsprint were used to carry secret messages.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

The present example non-limiting embodiment is implemented as a module to the Microsoft Office suite of applications. Whenever a user opens, saves or closes an application file (Word, Excel, Outlook or PowerPoint etc.), the application event is intercepted by the module. The module software encrypts the open file and then embeds the encrypted data within a "mule" file of the same type. For example, a PowerPoint file would be inserted into a PowerPoint mule file. This operation is invisible to the user and does not require user-intervention or passwords.

On receipt of the "mule" file, if the module isn't installed, the mule file will simply open as a normal Office document without the user having any awareness of the embedded encrypted file. On systems where the module is installed and properly authorized, the module will automatically detect the embedded encrypted file, decrypt the embedded file and present the decrypted file to the user without the user having any awareness that it was embedded in the mule file.

On saving or closing the open file, the file will be encrypted and saved within a "mule" file of the same type.

Figure 1:
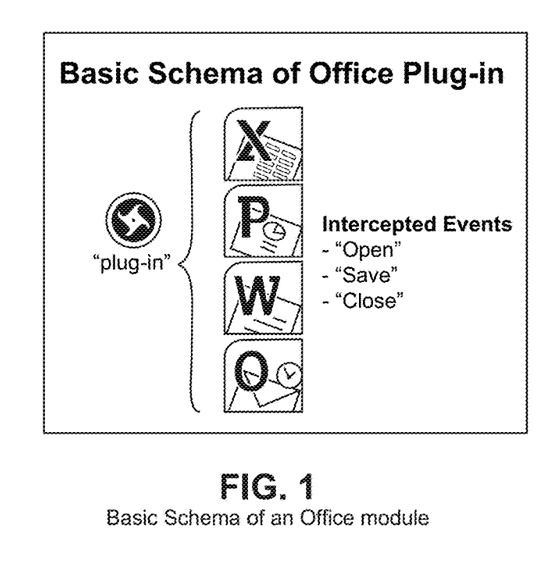
FIG. 1 shows a Basic Schema of an Office module.

The example non-limiting embodiment is embodied in an Office module that enables selected Microsoft Office Applications to create, open and save secure files. As shown in FIG. 1, Basic Schema of the Office module, the module intercepts user-activated function calls to create a new document, open a document, save a document or close a document. The module works essentially the same in any office application although minor differences exist based on the particular application.

Office Document XML Schema

Figure 2:
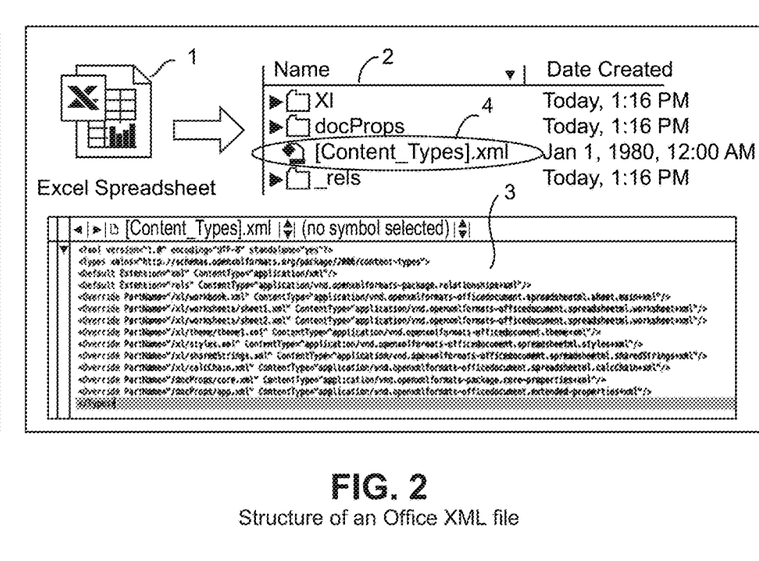
FIG. 2 shows Structure of a Microsoft Office XML-based file.

Microsoft Office application files (PowerPoint, Word, Excel, for example) utilize an XML-based schema. While an Office document appears to the user to be a single document, in reality the document is a container document consisting of multiple files as shown in FIG. 2. One can see this structure by simply "unzipping" any Office document (PowerPoint, Excel or Word).

A first step in securing an Office document is to create a standard Office document for that particular application. For instance, if an Excel document is to be secured, a "dummy" Office document is created. This document is referred to as the "mule file". Each file within the mule file document (1) is written in an XML open-standard format (2). This format consists of "nodes" with each node consisting of a "<" followed by a node name and terminated by a "/>" string. For example:

<Default Extension="png" ContentType="image/png"/>

FIG. 2 shows an example of the text of an XML file (3).

A comment can be freely inserted anywhere into an XML file by simply placing the text in the following structure:

<!-free text>

The exclamation point character ("!") signifies a comment field within an XML structure. Comment fields preceded and terminated by the carat characters "<" and ">" respectively are ignored when normally processing XML files.

Multiple comment fields can be inserted within an XML document without affecting the operation of an Office application.

Crypto String Insertion

It is precisely this factor: comment fields being ignored, that this example non-limiting embodiment exploits.

Of particular interest is the "[Content_Types].xml" file (4). Comments can be embedded with this file without affecting the overall application. In fact, such comments will be ignored during normal operation. This comment has no restrictions as to content or length.

In general terms, the sensitive document that is created by the user that he or she wishes to be protected is encrypted and the ciphertext is inserted as a comment field within the [Content_Types] xml file (4) that is part of a dummy Office document (1). The dummy or "mule" file (1) can be written as an innocuous file whose contents have no particular value or sensitivity. The ciphertext of the sensitive file is thus embedded as a comment within one particular file of the mule container file.

Closing an Office Document

Figure 3:
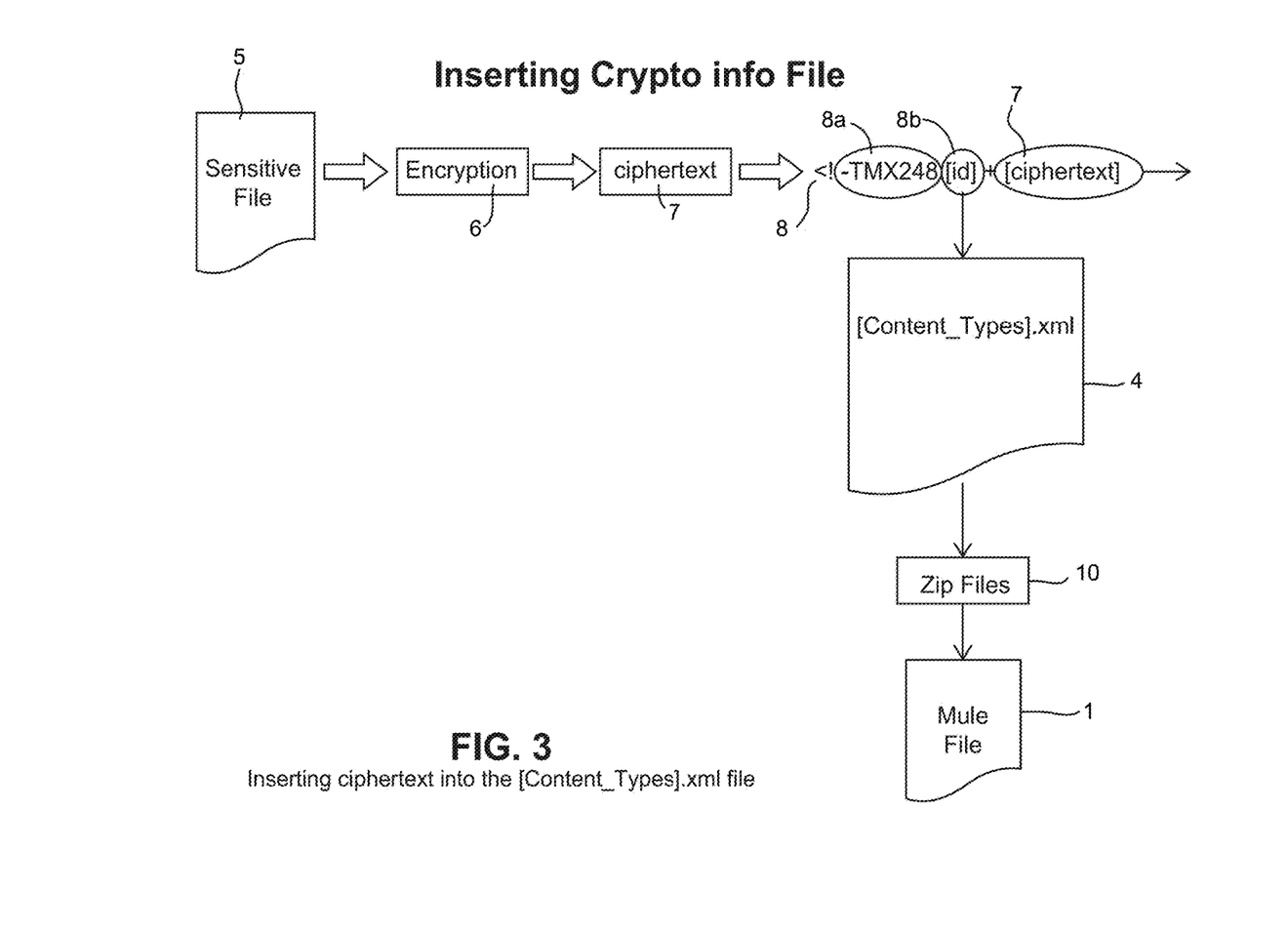
FIG. 3 shows Inserting ciphertext into file.

As shown in FIG. 3, when an active sensitive document is closed, a particular sequence of events takes place.

1. A "mule file" (1) is created and its component files are extracted (2) as shown in FIG. 2 into a temporary hidden directory.

2. The sensitive document (5) is closed and remains temporarily in a hidden temporary directory. It is a standard Office document at this point.

3. This file is now encrypted (6) by normal means.

4. The ciphertext (7) is encapsulated with an encryption designator (arbitrarily "TMX248:" (8a) and the user's registration_id (8b) along with the ciphertext (7).

5. The encapsulated ciphertext is appended as a comment field (8) to the [Content_Types].xml file (4) in the Extracted Files directory.

6. The multiple files (2) of the unzipped mule file (1) are now zipped together (10) into a standard Office mule file (1) and this file is now saved in the directory of the file originally opened or saved to a new location as the user wishes.

7. The temporary files (2) created with the application directory, in this case "ExcelFiles" are all deleted.

Opening an Office Document

Figure 4:
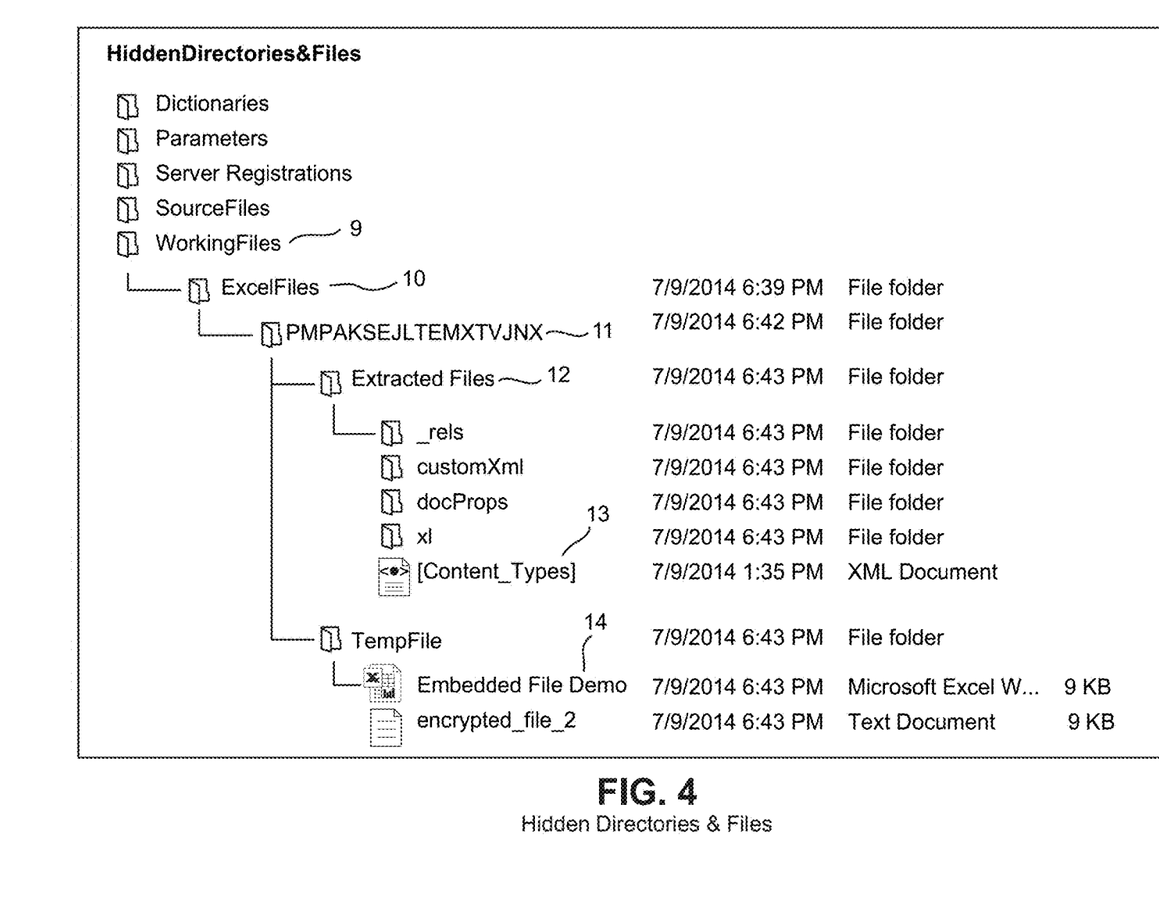
FIG. 4 shows Hidden Directories & Files.

When opening an Office document, for example the Excel mule file just closed (above), the module intercepts the "Open" event. The module does not know if this file is a mule file or not. It must first check to see if in fact it contains an embedded ciphertext comment field. As shown in FIG. 4, Hidden Directories & Files, 1. A hidden set of temporary folders is created in the "Working Files" (9) directory. The Working_Files directory is created by the module on initialization when the supporting application (example: Excel) is first run.

2. The module then creates a sub-directory named for the particular application the document was created in; in this case, an "ExcelFiles" directory (10).

3. Finally for this particular file, a folder (11) is created using a temporary random string as the name of the folder and as shown here, "PMPAKSEJLTEMXTVJNX". This folder (11) is hidden from view and is destroyed when the file is closed.

4. Within this temporary directory (11), two additional sub-directories are created: one to hold the extracted files of the mule file ("Extracted Files") (12) and one to hold the transient files ("TempFile") (14).

5. The mule file is unzipped into its various component files and stored in the Extracted Files folder (12)

Figure 5:
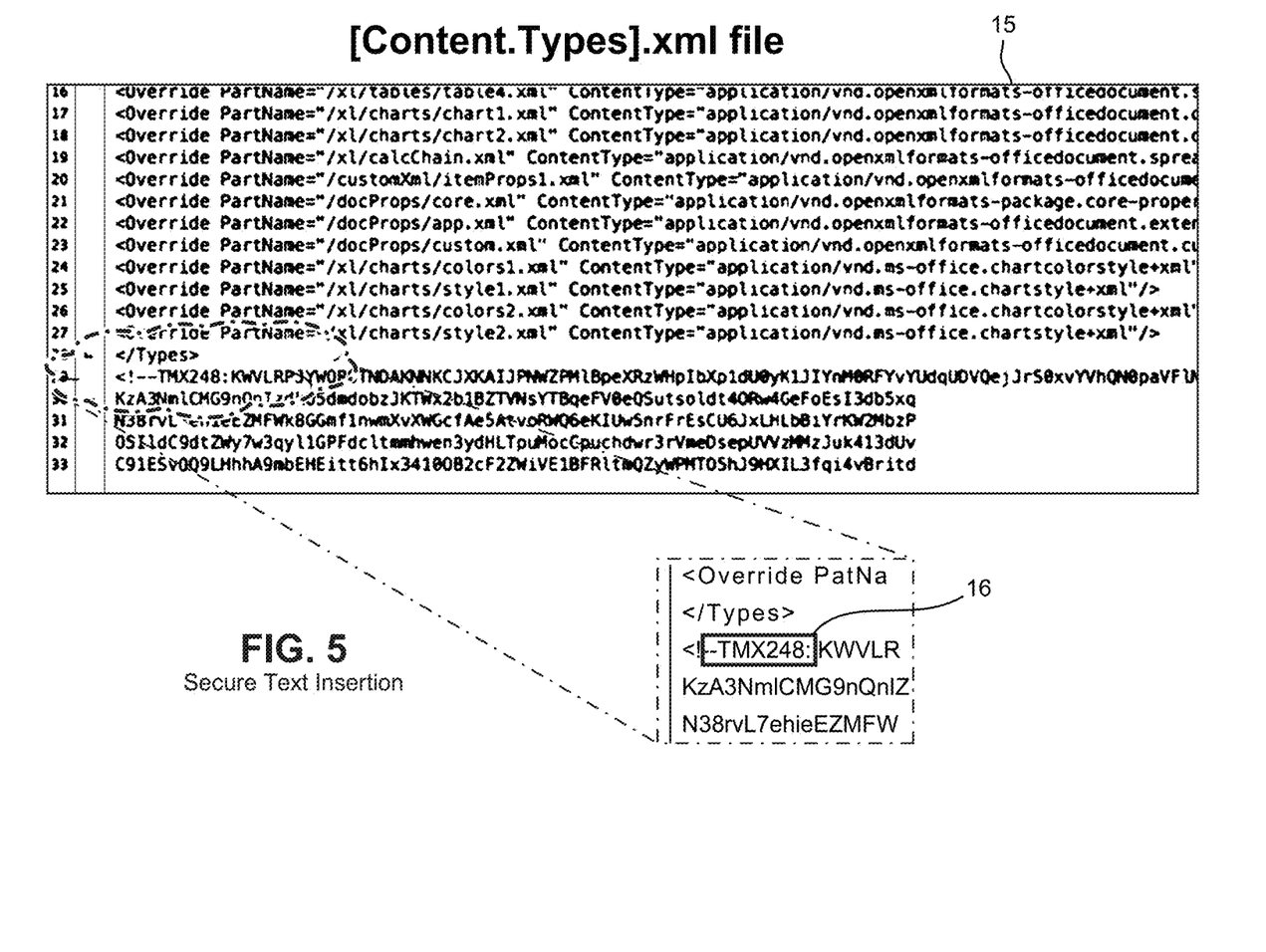
FIG. 5 shows [Content.Types] xml file example.

6. As shown in FIG. 5, the "[Content_Types].xml file (13) is now opened and the text of that file (15) is searched for the ciphertext comment field 16). This field is identified by the character string "<!-TMX248:" although any other character string could be suitably used. If the cryptotext comment field is not found, the module passes control back to the Office application after erasing and deleting the temporary folders (11) it created for this document. The file now opens normally. This is exactly the same manner of operation that would occur if the user did not have the module installed.

Figure 6:
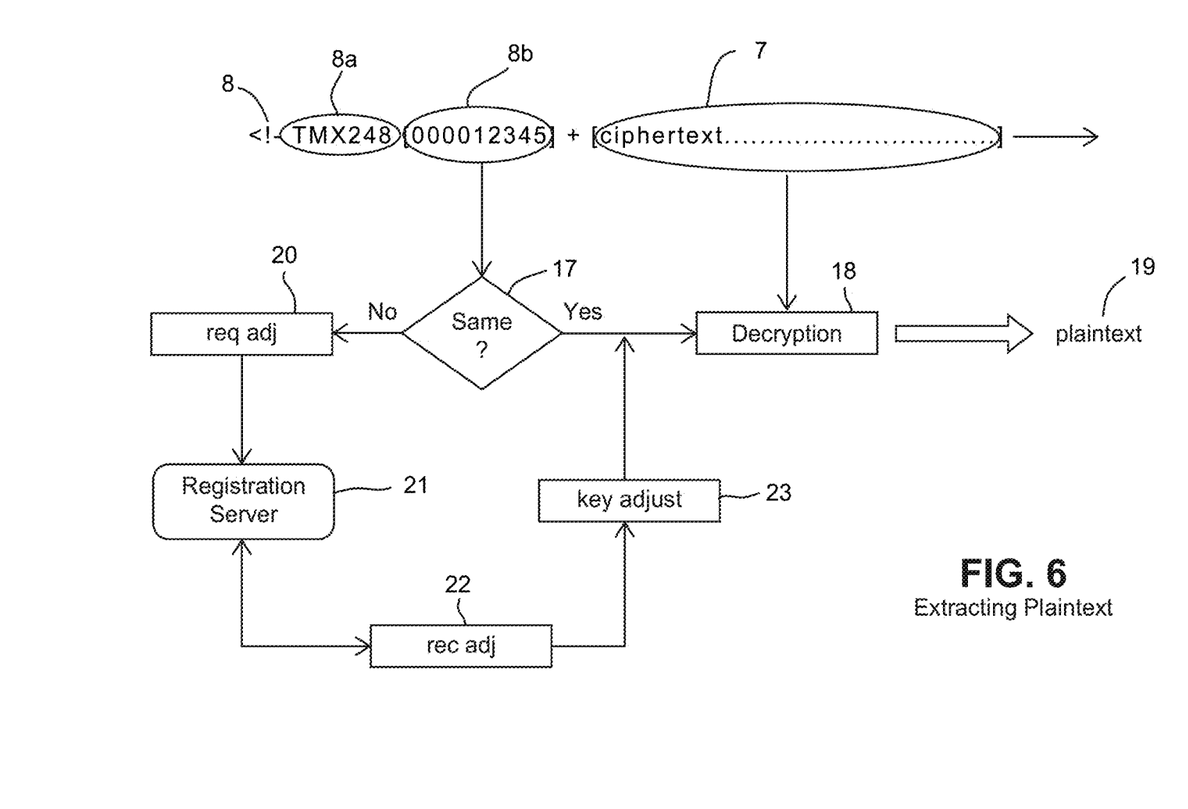
FIG. 6 shows Extracting Plaintext.

7. If the cryptotext comment field is found as shown in FIG. 6, the cryptotext (7) is extracted from the "[Content Types] xml" file (13) along with the registration id of the sender (8b). If the ids of the sender (8b) and the receiver are identical (17), a decryption operation (18) is attempted typically resulting in plaintext (19).

8. If the received id (8b) is different than the user's ID, the module will request an adjustment (20) by connecting to the domain's server (21) to retrieve information sufficient (22) to calculate the proper decryption parameters (23). If the decryption operation (18) fails, the module erases the temporary files it created and deletes the directories created and passes control back to the Office application and normal operation resumes with no awareness to the user.

9. If the cryptotext (7) can be successfully decrypted (18), the plaintext (19) is now saved as an Office document (14) (example shown: "Embedded File Demo" in FIG. 4) into the "TempFile" directory and the module passes control back to the Office application with the file location of the newly decrypted file. The user is likewise unaware of the fact that a file switch was made.

Note

Whenever the mule file is transmitted to another location, the receiving device/account will attempt to decrypt the embedded file and note if the embedded ID is different from the user's ID. The module will communicate with the domain server identifying the embedded ID of the sender and the receiver. The domain server knowing everyone's parameter sets will calculate a differential and return that to the module sufficient for the module to calculate the proper parameters to decrypt the file.

Figure 7:
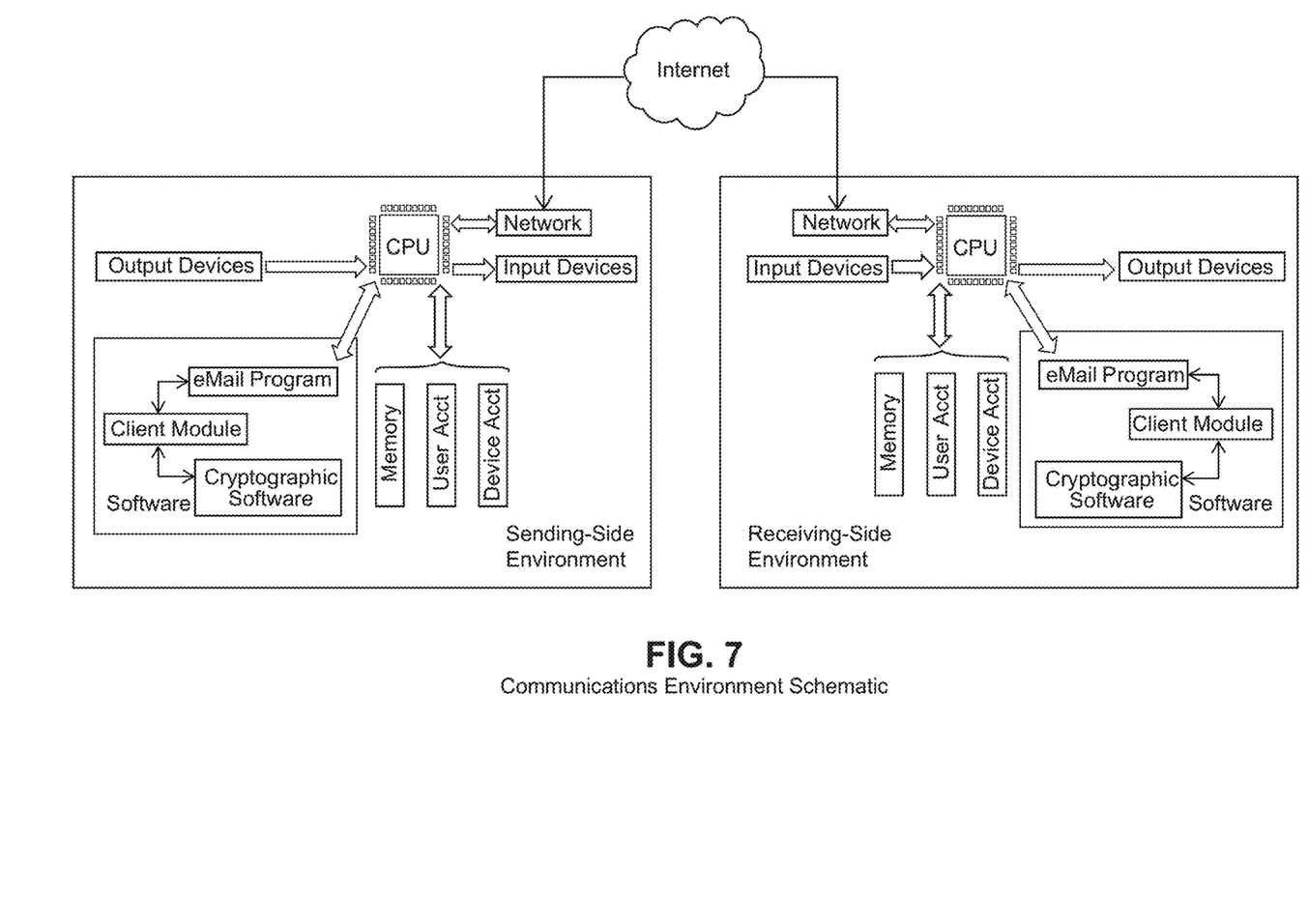
FIG. 7 shows an example environment.

As seen in FIG. 7, in one non-limiting embodiment, client-side software provides the mechanism for calculating encryption parameters for specific applications such as e-mail, word-processing, spreadsheets and presentations to encrypt their message/file traffic and embed them in documents or other software objects for secure storage and/or distribution to intended recipients. In the FIG. 7 example, a sending-side environment communicates over a communications network with a receiving-side environment. The sending-side environment and receiving-side environments each may comprise computing environments based on any kinds of computing devices such as personal computers, embedded processing systems, smart phones, tablets, wearable computers, handheld computers, or any other computing platforms. The communications network can similarly comprise any type of communications arrangement including cellular telephone network(s), local area network(s), the Internet, short range communications such as Bluetooth or NFC, or any other type of wired or wireless communications. In one example embodiment, the objects with embedded information are stored by the sending-side environment on local storage and/or in the "cloud" (e.g., on a remote server, NAS, or any other device) for transmission and/or retrieval by the same or different device.

In the FIG. 7 example shown, each environment comprises a CPU, a network adapter; input devices such as touch screen, keyboards, microphones or the like; output devices such as displays, speakers or the like; memory (flash, disk, RAM, ROM, etc.); account data storage and a software and/or hardware based encryption element. In some examples, the encryptor and decryptor can comprise processors executing encryption (decryption) cryptographic software that cooperates with a client module and an application such as for example an email program. In other implementations, the cryptographic functionality can be provided by hardware or by a combination of hardware and software. Each such environment may store information relating to a user account and information relating to a device account.

The client-side software, typically in the form of a module, automatically encrypts/decrypts messages and files without user intervention.

Example Non-Limiting Benefits

1. Secured files are most typically obvious by the nature of their encryption and can easily be singled out from non-secured files. By embedding the secured file within a mule file, the secured intellectual property is hidden from view.

2. The module allows the user to automatically recover and see the embedded file (if it exists) rather than the file that was opened. There is no extra step required by the user.

3. Similarly, when closing the file, the file is automatically encrypted, the ciphertext inserted into the content file and the files zipped into a mule file and the file closed with the same name as the file that was opened, all without user intervention.

4. Users who do not have the module or who are not properly authorized will see only the mule file when opening a document. They will be unaware of the embedded sensitive file.

5. Operation in all cases is fully automatic requiring no user intervention, no user-training and does not require passwords to be generated, distributed and stored.

6. The Office application behavior is unaffected by the use of this module.

It is possible to embed one document in another type. This allows information to flow even there may be filters in place to inhibit certain file formats. For instance, one can send audio, video, and zip files all masquerading as a jpg or other format. It is even possible to allow the user to select a particular encapsulation. Thus, while some embodiments embed certain files into mule files of the same type (e.g., a spreadsheet is embedded into a spreadsheet mule file), other embodiments may embed those files into mule files of different types.

The description contained herein is a "non-limiting exemplary embodiment" such that alternative methods and/or locations, etc., can be used. In particular, the choice of encryption technology is left up to one skilled in the arts; the choice of embedding location is similarly left up to one skilled in the arts.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of embedding and recovering secure information comprising:
    presenting at least one processor with sensitive information to be secured;
    with the at least one processor, encrypting said sensitive information into at least one cryptographic string at least comprising the encrypted data;
    with the at least one processor, creating a mule file complying with a standard format which specifies comment fields;
    with the at least one processor, embedding the at least one cryptographic string into at least one comment field within the mule file;
    with the at least one processor, at least one of communicating and storing the mule file containing the at least one comment field containing the embedded cryptographic string;
    upon request, initiating processing of the communicated and/or stored mule file with the same or different at least one processor;
    with the same or different at least one processor, detecting that the mule file contains the at least one embedded cryptographic string contained within the at least one comment field;
    with the same or different at least one processor, recovering the at least one cryptographic string from the mule file comment field;
    with the same or different at least one processor, decrypting the sensitive information from the recovered at least one cryptographic string; and
    with the same or different at least one processor, returning the sensitive information in lieu of contents of the mule file normally used for further processing.

2. The method of claim 1 wherein the mule file comprises a Microsoft Office file.

3. The method of claim 1 wherein the mule file comprises a Microsoft Excel file.

4. The method of claim 1 wherein the cryptographic string comprises cryptotext.

5. The method of claim 1 wherein the embedded cryptographic string is structured so it does not interfere with standard processing and viewing of the mule file.

6. The method of claim 1 wherein the mule file comprises an XML file.

7. The method of claim 1 wherein the mule file is stored within a container.

8. The method of claim 1 further including encrypting the mule file as part of a standard document.

9. The method of claim 1 further including encapsulating the ciphertext and appending the encapsulated ciphertext as a comment field to a [Content_Types].xml file.

10. The method of claim 1 wherein the at least one comment field is optional.

11. A method for communicating sensitive information comprising:
    with at least one processor, receiving sensitive information to be secured;
    with the at least one processor, encrypting said sensitive information into at least one cryptographic string comprising encrypted data;
    with the at least one processor, embedding the encrypted data into at least one comments field of a mule file; and
    with the at least one processor, communicating the mule file using standard communications channels and processing;
    wherein the mule file is configured to be processed using standard computation tools; and
    the cryptographic information embedded in the at least one comment field within the mule file is ignored when the standard computation tools are used to process the mule file but can be accessed, extracted and decrypted using non-standard computation tools.

12. The method of claim 11 wherein the mule file comprises an XML file.

13. The method of claim 11 wherein the mule file is stored within a container.

14. The method of claim 11 further including encrypting the mule file as part of a standard document.

15. The method of claim 11 further including encapsulating the ciphertext and appending the encapsulated ciphertext as a comment field to a [Content_Types].xml file.

16. The method of claim 11 further including encapsulating the ciphertext and appending the encapsulated ciphertext as a comment field to a [Content_Types].xml file.

17. The method of claim 11 wherein the at least one comment field is optional.

18. A method comprising:
   upon request, at least one processor initiating processing of a communicated and/or stored mule file;
   with the at least one processor, detecting whether the mule file contains at least one embedded cryptographic string that is contained within at least one comment field; and
   if the at least one processor detects that the mule file contains at least one embedded cryptographic string in the at least one comment field:
      recovering the at least one cryptographic string from the mule file's at least one comment field,
      with the at least one processor, decrypting the sensitive information from the recovered at least one cryptographic string, and
      with the same or different at least one processor, returning the sensitive information in lieu of content of the mule file normally used for further processing.

19. The method of claim 18 wherein the mule file comprises an XML file.

20. The method of claim 18 wherein the mule file is stored within a container.

21. The method of claim 18 further including encrypting the mule file as part of a standard document.

22. The method of claim 18 wherein the at least one comment field is optional.

23. A system for recovering sensitive information comprising:
   an output device;
   a storage device storing an XML, file container including at least one encrypted XML, file; and
   a processor operatively coupled to the storage device and to the output device, the processor configured to:
      decompress and decrypt the XML file to provide a decrypted, decompressed XML file;
      intercept and test the decrypted, decompressed XML file to determine whether the decrypted, decompressed XML file contains a cryptographic string hidden within at least one comment field that is not parsed by XML parsing;
      if the testing reveals the decrypted, decompressed XML file contains a cryptographic string hidden within at least one comment field, decrypt the hidden cryptographic string to obtain clear text, and output the clear text via the output device; and
      if the testing reveals the decrypted, decompressed XML file does not contain a hidden cryptographic string, passing the decrypted, decompressed XML file for parsing and further processing.

24. The system of claim 23 wherein the processor conditions decrypting the hidden cryptographic string on user authentication.

25. The system of claim 23 wherein the at least one comment field is optional.

* * * * *